(No Model.)
F. E. GOLDSMITH.
BEHEADING DEVICE.
No. 597,408. Patented Jan. 18, 1898.
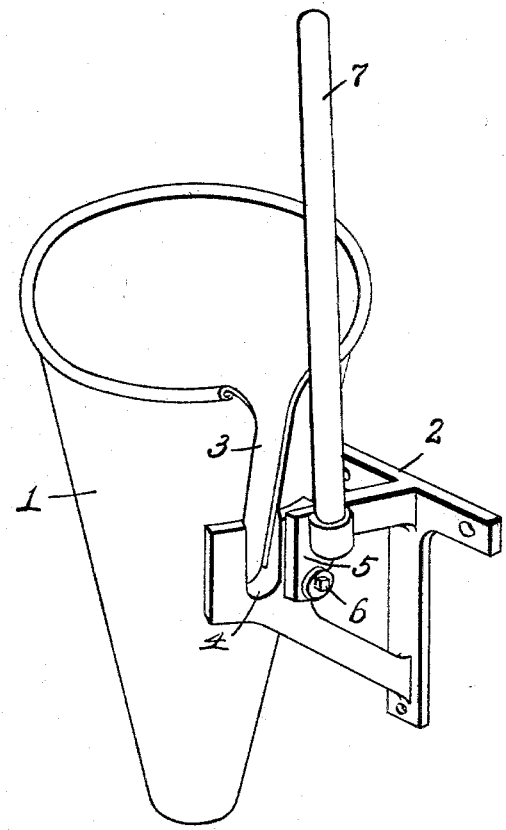
Frederick E. Goldsmith
Inventor
by James W. See
Attorney
Witnesses:
E. R. Shipley
M. S. Belden

UNITED STATES PATENT OFFICE.

FREDERICK E. GOLDSMITH, OF HAMILTON, OHIO.

BEHEADING DEVICE.

SPECIFICATION forming part of Letters Patent No. 597,408, dated January 18, 1898.

Application filed September 22, 1897. Serial No. 652,534. (No model.)

*To all whom it may concern:*

Be it known that I, FREDERICK E. GOLDSMITH, of Hamilton, Butler county, Ohio, have invented certain new and useful Improvements in Beheading Devices, of which the following is a specification.

This invention pertains to improvements in devices for use in beheading fowls; and the invention will be readily understood from the following description, taken in connection with the accompanying drawing, which is a perspective view of a beheading device exemplifying my invention.

In the drawing, 1 indicates a frusto-conical vessel open at both ends and having its smaller end below, this vessel being formed, preferably, of sheet metal and having a size adapting it to conveniently receive the fowl which is to be beheaded; 2, a bracket secured to the vessel and typifying means by which the vessel may be firmly supported in working position, the bracket being adapted to be secured against a wall or other supporting-surface; 3, a vertical slot in the wall of the vessel extending about half-way down the same, this slot having a width sufficient to receive the neck of the fowl; 4, the base of slot 3, the same forming a rest for the neck of the fowl, and a bottom die to coöperate with the cutter; 5, a cutting-blade pivoted on a horizontal pivot at one side of the base of slot 3, the cutting edge of this blade being adapted to have a shearing action with reference to base 4 of the vessel; 6, the pivot on which the blade works, and 7 a handle connected with the blade.

In using the device the fowl is placed within the vessel with its neck projecting out through the slot and resting on the base of the slot. The cutting-blade is now operated in an obvious manner by means of the handle, thus shearing the neck and severing the head. A pan or the like placed below the vessel serves to catch the head and the dripping blood. During the operation the fowl is so confined within the vessel that it can create no disturbance and there will be no spattering of blood. The device is extremely simple and efficient and calls for no skill in its manipulation.

It is obvious that the vessel, with its slot, might be employed with any form of cutting implement adapted for severing a fowl's neck; but the construction illustrated, in which a suitable cutting-blade is mounted upon the vessel, is the preferable construction.

I claim as my invention—

1. A device for beheading fowls, substantially as set forth, comprising a frusto-conical vessel having a slot in its side wall open at one end and closed at the other, the closed end of said slot forming a cutting-base.

2. In a device for beheading fowls, the combination, substantially as set forth, of a frusto-conical vessel having a slot in its side wall open at one end and closed at the other, the closed end of said slot forming a cutting-base, and a cutting-blade mounted on said vessel adapted for shearing coöperation with said cutting-base.

FREDERICK E. GOLDSMITH.

Witnesses:
J. W. SEE,
FRANK P. RICHTER.